(No Model.)
W. MACY.
ANIMAL POKE.
No. 386,481. Patented July 24, 1888.
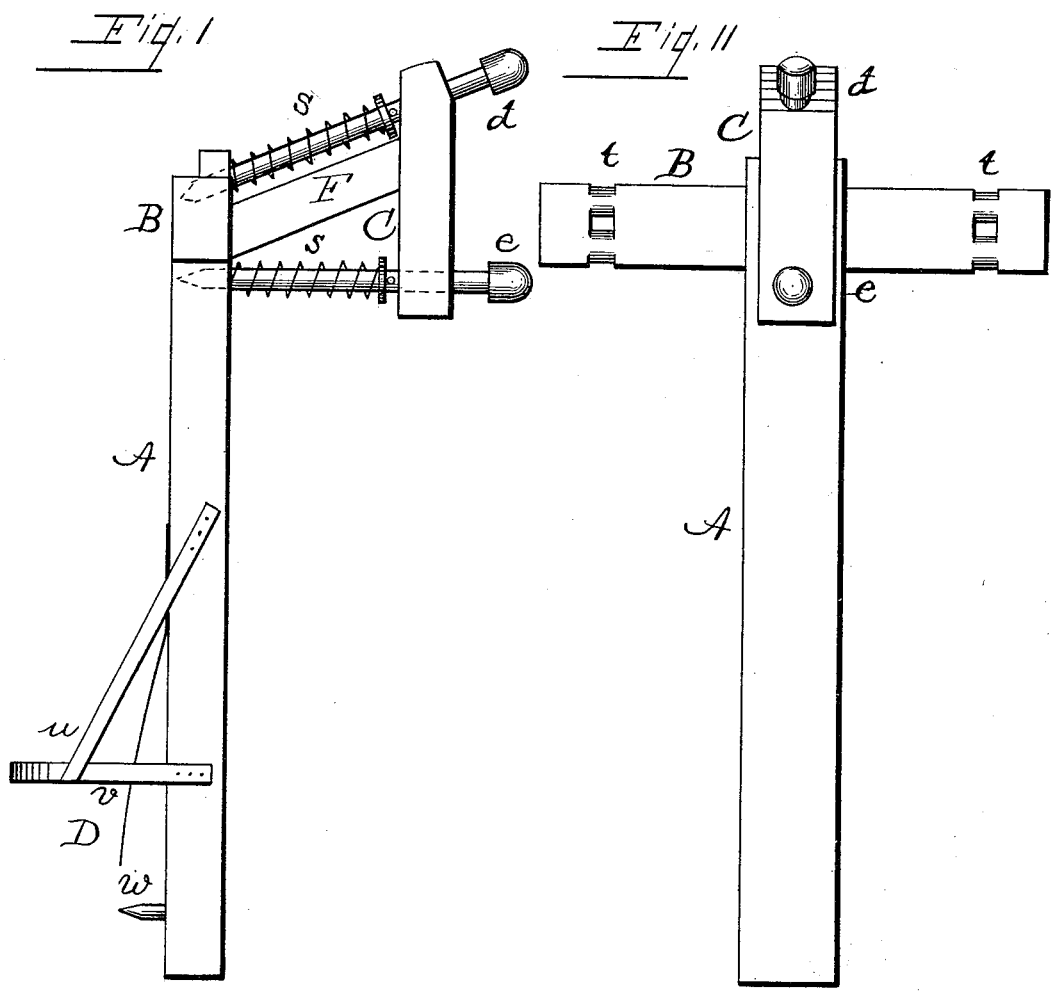
Witnesses.
Fred. Reibold.
Leopold Leibold.
Inventor.
William Macy.
By His Attorney B. Pickering.

United States Patent Office.

WILLIAM MACY, OF TIPPECANOE CITY, OHIO.

ANIMAL-POKE.

SPECIFICATION forming part of Letters Patent No. 386,481, dated July 24, 1888.

Application filed March 29, 1888. Serial No. 268,921. (No model.)

*To all whom it may concern:*

Be it known that I, WILLIAM MACY, a citizen of the United States, residing at Tippecanoe City, in the county of Miami and State of Ohio, have invented certain new and useful Improvements in Animal-Pokes; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in animal-pokes, the several features of which will be fully hereinafter set forth.

The objects of my invention are to prevent cattle pushing down fences with their noses and to prevent goring with their horns.

The device is illustrated in the accompanying drawings, in which—

Figure I is a side view of the device. Fig. II is a front view of the same.

In the views presented like letters designate like parts.

The frame of the poke comprises the face-piece A, the cross-piece B, the oblique part F, and the supporting part C, which is parallel with said face-piece. The cross piece has mortises $t$ in both ends for straps or cords, which are used in fastening the poke to the base of the horns of the animal. In orifices of the vertical parts are held the lances $d$ and $e$, the former in an oblique position and the latter in a horizontal position. These lances are cylindrical, having enlarged rounded heads, and the inner ends are sharp or pointed. The lances are held with the heads projecting beyond the frame by the spiral springs $s$ bearing against washers held by pins passing through orifices of the same. When the appliance is used to prevent goring, the parts thus far described only are used.

When an animal attempts to gore another, the lance strikes, the same projecting beyond the horns. The same is driven back against the head, thus inflicting pain, which restrains a further effort.

When used for animals that are breachy, the point $w$ is attached to the face-piece, and the flat spring D prevents the same from piercing the nose of the animal only when a thrust is made against a fence, and as pain is thus inflicted the breach is prevented. A nose-strap is shown at $v$ and the stay $u$, both being tacked to the face-piece. This nose-strap may be used or not, as may seem most desirable. From the description already given, its uses to prevent goring and a breach of a fence are sufficiently apparent.

To attach the appliance the face-piece is placed against the face of the animal and the cross-piece is securely buckled or tied to the horns at their base. A single lance, perhaps, in most cases would be sufficient; but in addition to those described two lateral oblique lances may be used in a broadened front supporting-piece. As the horns of animals are not uniform in position and length, the lance must be varied to suit these conditions.

Having fully described my invention, what I claim, and desire to secure by Letters Patent, is—

An animal-poke comprising the face-piece A, with transverse arms B, having slots for straps, the oblique part F, the supporting part C for the outer end of the lances, and said lances held in said face-piece and said supporting part, with spiral springs to hold the lances outwardly from the head of the animal, substantially as set forth.

In testimony that I claim the foregoing as my own I affix my signature in presence of two witnesses.

WILLIAM MACY.

Witnesses:
HARRY HORTON,
ELLIS H. KERR.